US012616083B2

(12) United States Patent
Bujalski et al.

(10) Patent No.: US 12,616,083 B2
(45) Date of Patent: May 5, 2026

(54) DEVICE FOR DISTRIBUTING FERTILIZER

(71) Applicant: Yara International ASA, Oslo (NO)

(72) Inventors: Jakub Bujalski, Porsgrunn (NO);
Robertus Louwe, Porsgrunn (NO);
Amund Myrstad, Skien (NO)

(73) Assignee: YARA INTERNATIONAL ASA, Oslo
(NO)

( * ) Notice: Subject to any disclaimer, the term of this
patent is extended or adjusted under 35
U.S.C. 154(b) by 14 days.

(21) Appl. No.: 18/836,881

(22) PCT Filed: Feb. 10, 2023

(86) PCT No.: PCT/EP2023/053271
§ 371 (c)(1),
(2) Date: Aug. 8, 2024

(87) PCT Pub. No.: WO2023/152272
PCT Pub. Date: Aug. 17, 2023

(65) Prior Publication Data
US 2025/0031607 A1 Jan. 30, 2025

(30) Foreign Application Priority Data

Feb. 11, 2022 (EP) ..................................... 22156371

(51) Int. Cl.
*A01C 21/00* (2006.01)
*A01C 14/00* (2006.01)
(Continued)

(52) U.S. Cl.
CPC ............ *A01C 21/007* (2013.01); *A01C 14/00*
(2013.01); *A01C 21/005* (2013.01); *G05D*
*11/02* (2013.01); *B33Y 30/00* (2014.12); *C05G*
*5/10* (2020.02)

(58) Field of Classification Search
CPC ..... A01C 21/007; A01C 21/005; A01C 14/00;
B33Y 30/00; B01J 2/22; C05G 5/10;
G05D 11/02
See application file for complete search history.

(56) References Cited

U.S. PATENT DOCUMENTS 6,936,681 B1 * 8/2005 Wertz ....................... C05G 5/30
524/839
2020/0045878 A1 * 2/2020 Zerulla ................. A01C 21/007
(Continued)

FOREIGN PATENT DOCUMENTS

CN        112250498 A      1/2021
CN        113455156 A     10/2021
(Continued)

OTHER PUBLICATIONS

International Search Report and Written Opinion issued in App. No.
PCT/EP2023/053271, dated May 2, 2023, 13 pages.
(Continued)

*Primary Examiner* — Marina A Tietjen
(74) *Attorney, Agent, or Firm* — DILWORTH IP, LLC

(57) ABSTRACT
A device for distributing solid particles in a field, including
elements for producing the solid particles from at least two
solid, particulate compositions; the elements for producing
including at least two containers for storing each of the solid,
particulate compositions, wherein the elements for produc-
ing are capable of producing solid particles with different
ratios of the at least two solid, particulate compositions; and
elements for delivering the solid particles to the field. The
present disclosure also provides a method for distributing
solid, fertilizer particles to a field with the device.

15 Claims, 1 Drawing Sheet

(51) Int. Cl.
| | | |
|---|---|---|
| B33Y 30/00 | (2015.01) | |
| G05D 11/02 | (2006.01) | |
| C05G 5/10 | (2020.01) | |

(56) References Cited

U.S. PATENT DOCUMENTS

| | | | | |
|---|---|---|---|---|
| 2021/0337719 A1* | 11/2021 | Schmidt | ................. | A01C 7/105 |
| 2021/0402427 A1* | 12/2021 | Gray | .................... | E01H 10/007 |

FOREIGN PATENT DOCUMENTS

| | | | |
|---|---|---|---|
| GB | 1398460 | A | 6/1975 |
| KR | 101644754 | B1 | 8/2016 |

OTHER PUBLICATIONS

Extended European Search Report issued in App. No. 22156371.1, dated Jul. 26, 2022, 9 pages.

* cited by examiner

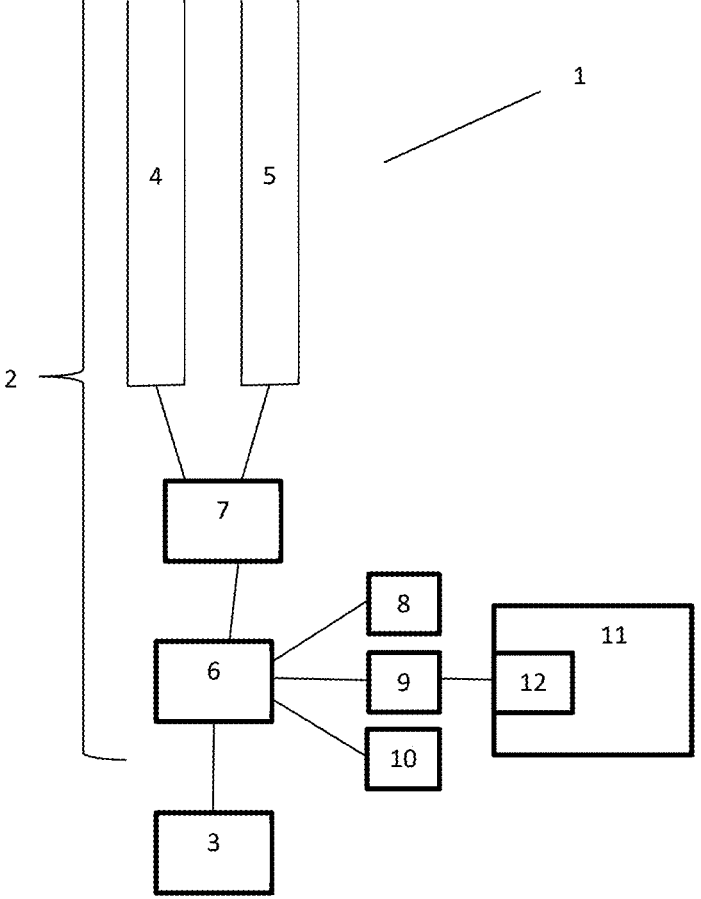

DEVICE FOR DISTRIBUTING FERTILIZER

FIELD OF THE INVENTION

The present disclosure is related to the field of devices for agriculture, in particular devices for distributing fertilizer products in a field.

BACKGROUND OF THE INVENTION

Modern agriculture often requires the distribution of fertilizer products to crops in a field to ensure optimum growth and yield.

Crops require several elements in their life cycle: macronutrients (nitrogen (N), phosphorus (P) and potassium (K)), secondary nutrients (magnesium, calcium and sulfur) and micronutrients (boron, copper, iron, molybdenum, manganese and zinc).

Fertilizer products can be provided in two forms to the crops: as solid products, such as granules or prills, or as liquid products, such as aqueous solutions.

Solid products are the most common form used since they can be manufactured in large amounts, and are easier to transport (since they do not contain water). They can be distributed on a field by hand or with mechanical devices, such as spreaders.

A drawback of the current techniques is that the same product is applied to an entire field, and growing conditions can differ a lot within a single field: some areas may receive less light due to the presence of tall structures like buildings or trees, some areas may receive more water (if the field is not flat for example), some areas may have a higher concentration of the crop. These differences mean that the fertilizer requirements for a field may not be homogeneous over the entire field.

Systems that apply solid fertilizers at a variable rate exist, wherein the mechanical means can distribute more or less fertilizer based on different sources of data. This is particularly used for nitrogen applications. However, such a system still applies the same fertilizer product across the whole field, which may be acceptable if the fertilizer product contains only one type of nutrient, such as nitrogen. However, using mononutrient fertilizer increases the number of operations for the farmer who needs to supply several nutrients to its crops, so the use of multi-nutrient fertilizers, such as NPK fertilizers is favored by farmers.

So there is a need to find a new method and device to apply fertilizer products, wherein the composition of the fertilizer products vary across a field.

SUMMARY OF THE INVENTION

The present inventors have designed a new device to apply fertilizer products in a field, wherein the composition of the fertilizer products vary across the field.

In a first aspect, the present disclosure provides a device for continuously producing and distributing solid particles in a field, comprising a means for producing the solid particles from at least two solid, particulate compositions each having a different chemical composition; the means for producing comprising at least two containers for storing each of the solid, particulate compositions, wherein the means for producing is capable of producing solid particles with different ratios of the at least two solid, particulate compositions; and a means for delivering the solid particles to the field.

In another aspect, the present disclosure provides a method for distributing solid, fertilizer particles to a field, comprising the steps of: a) providing a device or a system according to the present disclosure; b) providing at least two solid, particulate compositions to the containers of the device; c) continuously producing the solid, fertilizer particles from the at least two solid, particulate compositions each having a different chemical composition with the means for producing the solid particles; d) continuously delivering the solid particles produced in step c) to the field with the means for delivering the solid particles to the field.

BRIEF DESCRIPTION OF THE FIGURES

The following description of the FIGURE of a specific embodiment of a system according to the present disclosure is only given by way of example and is not intended to limit the present explanation, its application or use. In the FIGURE, identical reference numerals refer to the same or similar parts and features.

FIG. 1 shows an embodiment of a device according to the present disclosure.

DETAILED DESCRIPTION OF THE INVENTION

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, in particular +/−10% or less, more in particular +/−5% or less, even more in particular +/−1% or less, and still more in particular +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "weight percent", "% wt" or "weight %", here and throughout the description unless otherwise defined, refers to the relative weight of the respective component based on the overall weight of the formulation.

In a first aspect, the present disclosure provides a device for producing and distributing solid particles in a field, comprising a means for producing the solid particles from at least two solid, particulate compositions each having a different chemical composition; the means for producing comprising at least two containers for storing each of the solid, particulate compositions, wherein the means for producing is capable of producing solid particles with different ratios of the at least two solid, particulate compositions; and a means for delivering the solid particles to the field.

As referred to herein, the wording "each having a different chemical composition" refers to solid, particulate compositions having a different chemical composition either in the concentration of the individual substances in the solid, particulate composition and/or in the actual types of individual substances present in the solid, particulate composition. This can thus either refer to the solid, particulate compositions comprising different chemical constituents (different chemical substances), to the solid, particulate compositions comprising different concentrations of the same individual substances or the combination of both.

The device is configured to produce and distribute solid particles, in particular solid, fertilizer particles, containing at least two different components. The means for producing the solid particles of the device comprises at least two containers that store the components, which may be solid, particulate compositions, from which the solid fertilizer particles are produced.

The volume of the containers may be adapted depending on the amount of the solid, particulate compositions required to distribute in one or more fields.

In one embodiment, a container has a volume of from 10 to 10 000 liters or $dm^3$, from 10 to 1 000 liters or $dm^3$, from 100 to 10 000 liters or $dm^3$, or from 100 to 1 000 liters or $dm^3$.

In one embodiment, a container is hermetically sealed, so that no moisture can come inside the container and into contact with the composition stored in the container.

The means for producing the solid particles may be any suitable means available in the field. It is configured to transform both solid, particulate compositions from the containers into solid particles that contain a certain ratio of both solid, particulate compositions.

Several types of devices are known to produce solid particles from other solid, particulate compositions. The solid particles may have an average particle diameter ranging between 1.0 mm and 10 mm.

In one embodiment, the means for producing the solid particles from at least two solid, particulate compositions is configured to produce the solid particles using a process selected from the group consisting of fused deposition modelling, direct metal laser sintering, powder pressing, powder compaction, and binder jetting.

Fused deposition modelling is a method wherein an object is built layer by layers by depositing a molten material. This can be done using a filament of material that is heated above its glass transition and extruded on top of previous extrusions, creating the object layer by layer.

Direct laser sintering is a method is a method wherein a heat source, such as a laser, is applied to a layer of powder, such that the atoms of the powder fuse without melting. Once the correct pattern is formed on the layer, a new layer of powder is applied, and the laser heats up the required locations of the new layer.

Binder jetting is similar to direct laser sintering in that the object is created from layers of the powdered raw material, but in the case of binder jetting, the binding of the raw material is achieved by the application of a binding agent instead of heat.

In the methods of direct laser sintering and binder jetting, different known methods can be used to stabilize the layers of raw material on a surface, such as electrostatic charges.

Is it also envisaged that the solid particles may be produced by compacting or pressing the different solid, particulate composition together. Such method produces particles with a lower strength, but this may be acceptable. If the means for delivery do not subject the particles to important stresses during the delivery, for example the means for delivery drops the particle from a height below 2 or 3 meters, a low-strength particle is suitable for the application.

In one embodiment, the means for producing the solid particles may produce one or more particles simultaneously.

In one embodiment, the means for producing the solid particles from at least two solid, particulate compositions comprises a three dimensional (3D)-printer. 3D-printing refers to the technology of creating 3D-objects, often using automated processes and machines. 3D-printing is also referred to as additive manufacturing. 3D-printing can be achieved by a variety of techniques, such as: fused deposition modelling (FDM), stereolithography (SLA), digital light-weight process (DLP), continuous liquid interface production (CLIP), material jetting, binder jetting, selective optical device sintering (SLS), multi-jet fusion (MJF), direct metal laser sintering (DMLS), sheet lamination, and directed energy deposition (DED). All these terms are known in the field.

In one embodiment, the 3D printer is a 3D printer using a process selected from the group consisting of fused deposition modelling, direct metal laser sintering and binder jetting. These three processes are known to be suitable to transform two or more solid, particulate composition into solid particles, wherein each solid particle comprises an amount of each of the two or more solid, particulate compositions.

The means for producing the solid particles is capable of producing solid particles with different ratios of the at least two solid, particulate compositions. This allows the device to distribute fertilizer particles with variable compositions across a field, and a more precise fertilization of the field, providing the right nutrients at the right place. The means for producing may comprise a controlling unit to control the flow of solid, particulate compositions between the containers and the production location of the solid particles and to be able to produce solid particles with different ratios.

The means for producing may comprise additional devices for transforming the solid, particulate compositions stored in the containers into an intermediate composition. For example if the means for producing comprise a 3D-printer, the 3D-printer may not be able to use directly the solid, particulate composition as stored in the container. For example, a 3D-printer using the fused deposition modelling needs a molten or liquid composition to operate, and cannot use powders, prills or granules. So a device comprising such 3D-printer may comprise a device that heats up solid particles into a melt. Other 3D-printers, such as binder jetting printer or direct laser sintering printers, require fine powders as starting materials, so a device comprising such 3D-printer may comprise a crusher to transform coarse granules with an average size over 500 μm or 1 mm into powders. The means for producing may produce solid particles with different shapes, such as circular or hemi-circular, and different sizes, such as from 1.0 mm up to 10 mm. The solid particles produced by the means for producing may be granules, prills, pastilles, or any kind of 3D object.

In one embodiment, the means for producing the solid particles from at least two solid, particulate compositions comprises a three dimensional (3D)-printer and comprises one or more printing unit. The 3D-printer may comprise one or more printing units. Having several printing units allows the 3D-printer to produce several particles simultaneously.

The device also comprises a means for delivering the solid particles to the field. This means is configured to receive solid particles from the means for producing solid particles, and distribute these to the field. The means for delivering can be a simple trap, such that the particles are dropped into the field, but it may also be a more complex system. For example, the means for delivering the solid particles to the field may be able to project the solid particles up to 5 meters away. In one embodiment, the means for delivering comprises a mechanical spreader or a pneumatic spreader.

In one embodiment, the means for delivering is an unmanned aerial vehicle or drone. A drone may be able to carry from several grams to several hundred grams of solid particles, and can fly over several hundred meters, or even a few kilometers to deliver the solid particles across an entire field. The drone may be autonomous and may deliver the solid particles according to a pre-established flight plan, or it may be operated in real-time by an operator.

In one embodiment, the device according to the present disclosure comprises at least three containers for storing each of the solid, particulate compositions. In particular, the means for producing the solid particles comprises three containers for storing the solid particulate compositions, each solid, particulate composition having a different chemical composition. It can be an advantage for the device to comprise at least three containers as crops require three primary nutrients in large amounts to ensure optimal growth: nitrogen, phosphorus and potassium. A device with at least three containers can store at least one solid particulate composition comprising each of the three primary nutrients.

In one embodiment, the device comprises a memory unit. A memory unit can store information on the nutrient requirements of the field and can be used by the means for producing to control the content of the solid particles produced therein across an entire field.

In one embodiment, the device is autonomous. A device comprising a memory unit in its controlling unit may operate autonomously once all the required instructions have been loaded into the controlling unit. The device may require different types of information to be pre-loaded depending on the configuration of the field and the other devices connected to it. For example, the device according to the present invention may require knowing information such as the location and configuration of the field it needs to fertilizer, the local weather forecast, and/or the type of crop planted on the field.

In one embodiment, the device comprises a communication unit, in particular a wireless communication unit. It may be an advantage that the device is able to communicate in real time with other devices. These other devices may provide real-time information on the status of the field and may be used to modulate the composition of the solid particles produced and delivered by the device.

In one embodiment, the device comprises a locating unit. The locating unit is configured to communicate to the device its location or geographical position. The locating unit may use a satellite-based technology such as the Global Positioning System (GPS), Galileo or other equivalent systems such as terrestrial signal triangulation.

In one embodiment, each container contains the solid, particulate compositions, in particular wherein each solid, particulate composition comprises a nutrient not present in the other solid, particulate compositions.

In one embodiment, the device comprises wheels. Wheels allow the device to be moved across a field so that solid particles can be distributed to the entire field.

In one embodiment, the device is attached to another device comprising wheels, in particular an agricultural device, such as a tractor.

In one embodiment, the device comprises a power source, such as a battery, solar panels or an electricity generator. The device may comprise its own power source such that it can function without being connected to a power grid. Some elements of the device, such as the means for producing, may require a form of power, such as electricity, to function, and it may be an advantage that the device comprise a power source, so that it can function without access to infrastructure, such as a power grid.

In another aspect, the present application provides a system comprising the device according to the present invention and a device for determining the status of a plant comprising a communication unit able to exchange data with the communication unit of the device according to the present invention. Today, there are several devices available to farmers and agronomists that can measure in real-time one or more parameters of a plant or a crop. For example, some devices, such as the one disclosed in WO2018/122236A1, can measure the nitrogen content in leaves and determine whether or not the crop has enough nitrogen. It could be an advantage to connect the device according to the present disclosure to such devices and carry out real-time measurement as the device moves across the field and distribute fertilizer particles. The measurement by the device can be taken into account by the controlling unit to adjust the flow of one or more solid, particulate composition to the means for producing solid particles.

In another aspect, the present disclosure provides a method for distributing solid, fertilizer particles to a field, comprising the steps of: a) providing a device or a system according to the present disclosure; b) providing at least two solid, particulate compositions to the containers of the device; c) continuously producing the solid, fertilizer particles from the at least two solid, particulate compositions each having a different chemical composition with the means for producing the solid particles; d) continuously delivering the solid particles produced in step c) to the field with the means for delivering the solid particles to the field.

As referred to herein, the wording "each having a different chemical composition" refers to solid, particulate compositions having a different chemical composition either in the concentration of the individual substances in the solid, particulate composition and/or in the actual types of individual substances present in the solid, particulate composition. This can thus either refer to the solid, particulate compositions comprising different chemical constituents (different chemical substances), to the solid, particulate compositions comprising different concentrations of the same individual substances or the combination of both. In some embodiments, each solid, particulate composition of the at least two solid, particulate compositions comprises a nutrient not present in the other solid, particulate compositions.

The method uses a device as described above. The containers of the device must be supplied with solid, particulate compositions, in particular solid, particulate fertilizer compositions. The solid, particulate compositions may be any composition comprising at least one nutrient required by crops. In one embodiment, the solid, particulate composition is a powder, in particular a powder with an average particle size of less than 100 μm, measured by a sieving test, a light diffraction analysis, or an image analysis.

In one embodiment, the solid, particulate composition comprises a primary nutrient, a secondary nutrient and/or a micronutrient.

In one embodiment, the solid, particulate composition comprises selenium.

In one embodiment, the solid, particulate composition comprises a component selected from the group consisting of urea, ammonium nitrate, ammonium sulphate, ammonium phosphate, potassium chloride, potassium sulphate, potassium nitrate, potassium phosphate, and calcium nitrate.

In one embodiment, the solid, particulate composition comprises particles with an average particle diameter ranging between 0.10 mm and 5.0 mm. The particles have a size that can be used by the means for producing. Different means may have different requirements for the material to be handled.

When the containers have received their solid, particulate composition, the production of solid particles by the means for producing can start. The production is continued until enough fertilizer products for the entire field or area has been produced.

The solid particles may contain other components or chemicals than the solid, particulate compositions contained in the container, depending on the technique used by the means for producing.

For example, if the means for producing comprises a 3D printer using the fused deposition modelling, it may require the use of an additional component to transform the solid, particulate compositions into a filament that can be used in such a system.

Alternatively, if the means for producing comprises a 3D printer using binder jetting, the solid particles may contain an amount of binder.

Once the first solid particles have been produced by the means for producing, the delivering step to the field by the means for delivering may begin. The solid particles may be delivered close to the location of the device, for example within one meter, but they may also be sent at least 1, 2, 3, 4 or 5 meter away from the device.

A suitable means for delivering is selected depending on the desired delivery technique. To ensure that the whole field is provided with nutrients, the device may be moved across the field. The movement of the device in the field may be dependent on the functioning of the means for delivering, for example if the means for delivering is able to deliver the solid particles 5 meters away from the device, or can only drop the solid particles below the device. The movement of the device in the field may be influenced by the nature of the means for delivering. A device equipped with a means that can only drop the solid particles below the device will need to be moved across a greater distance than a device equipped with a means that can project solid particles up to 5 meters away.

In one embodiment, the means for delivering is an unmanned aerial vehicle or drone. A drone may be able to carry from several grams to several hundred grams of solid particles, and can fly over several hundred meters, or even a few kilometers to deliver the solid particles across an entire field. The drone may be autonomous and may deliver the solid particles according to a pre-established flight plan, or it may be operated in real-time by an operator. Using a drone as delivering means may reduce the need for moving the device across the field. The device may be placed in a spot in a field where the drone can reach the entire field, and so the device may produce in a single location the fertilizer products, which are then delivered to the field with the drone.

If the means for delivering is a drone, the device may not be required to move. If the service range of the drone is enough to cover an entire field from a single position, the device can remain in that position.

In one embodiment, the method comprises the step of connecting the device to an agricultural machine, such as a tractor. Before the device starts the production of solid particles, it can be attached to another device, in particular a device comprising a motor able to move across the field. Tractors are devices comprising a motor that are present in all farms. Tractors are used to connect different devices, such as seeders, planters, or sprayers, to it and carry that device across a field so that it can perform its task. The device according to the present invention may be attached to a tractor to facilitate the distribution of fertilizers across a field. The agricultural machine may also be used as a power or electricity source for the device.

In one embodiment, each solid, particulate composition comprises a nutrient not present in the other solid, particulate compositions. It may be an advantage that the different solid, particulate compositions comprise at least one different nutrient from each other. There might be some overlap, for example, two containers may comprise nitrogen sources, but one of the containers may contain an additional nutrient such as phosphorus or potassium. This may allow a greater variation in the composition of the solid particles produced by the device. For example, one container may contain only nitrogen as a nutrient, for example in the form of urea or ammonium nitrate, and another container may comprise ammonium phosphate. Ammonium phosphate also comprises a source of nitrogen in the form of ammonium ions, but it also comprises phosphorus.

In one embodiment, the device comprises at least three containers, wherein one container is configured to receive a nitrogen source, one container is configured to receive a phosphorus source, and one container is configured to receive a potassium source. In particular, the means for producing the solid particles comprises at least three containers, wherein one container is configured to receive a nitrogen source, one container is configured to receive a phosphorus source, and one container is configured to receive a potassium source.

In one embodiment, the solid, particular composition added to the container comprises urea and/or ammonium nitrate.

In one embodiment, the solid, particular composition added to the container comprises ammonium phosphate.

In one embodiment, the solid, particular composition added to the container comprises potassium chloride or potassium sulphate.

In another aspect, the present disclosure provides the use of the device according to the present disclosure for distributing fertilizer particles to a field.

FIG. 1 shows an embodiment of a device according to the present disclosure. The device 1 comprises a means 2 for producing solid particles and a means 3 for delivering solid particles to the field. The means 2 for producing comprises two containers 4, and 5. Under operations, the two containers 4, 5 receive and store two different solid, particulate compositions. For example, the first container 4 may store urea or ammonium nitrate particles, and the second container 5 may store monoammonium phosphate or potassium sulphate particles. The means 2 for producing is a 3D printer 6 using the fused deposition modelling technique. The means 5 for producing comprises a device 7 for heating up the urea or ammonium nitrate particles from the first container to form a melt and mixing the particles stored in the second container (ammonium phosphate or potassium sulphate) with that melt. The composition obtained is then sent to the 3D printer 6, which transforms the melt into 3D particles. The means for delivering 3 is a mechanical spreader capable of throwing solid particles up to 5 meters away from the device.

The device 1 may comprise a memory unit 8. The memory unit 8 can store information on the nutrient requirements of the field and can be used by the means 2 for producing to control the content of the solid particles produced therein across an entire field.

The device 1 may comprise a communication unit 9, in particular a wireless communication unit. It may be an advantage that the device 1 is able to communicate in real time with other devices. These other devices may provide real-time information on the status of the field and may be used to modulate the composition of the solid particles produced and delivered by the device 1.

The device 1 may also comprise a locating unit 10. The locating unit 10 is configured to communicate to the device 1 its location or geographical position. The locating unit 10 may use a satellite-based technology such as the Global Positioning System (GPS), Galileo or other equivalent systems such as terrestrial signal triangulation.

A device 11 for determining the status of a plant may be provided comprising a communication unit 12 able to exchange data with the communication unit 9 of the device 1.

The invention claimed is:

1. A device for continuously producing and distributing solid particles in a field, comprising:
   a means for producing the solid particles from at least two solid, particulate compositions each having a different chemical composition, the means for producing comprising a first container for storing a first one of the solid, particulate compositions, a second container for storing a second one of the solid, particulate compositions, a device for heating at least a portion of the first one of the solid, particulate compositions from the first container to form a melt and mixing at least a portion of the second one of the solid, particulate compositions from the second container with the melt to form a mixed composition, and a 3D printer for producing solid particles from the mixed composition with different ratios of the at least two solid, particulate compositions; and
   a means for delivering the solid particles to the field.

2. The device according to claim 1, further comprising a third container for storing a third one of the solid, particulate compositions, each solid, particulate composition having a different chemical composition.

3. The device according to claim 1, wherein the means for delivering the solid particles to the field is able to project the solid particles up to 5 meters away.

4. The device according to claim 1, further comprising a memory unit.

5. The device according to claim 1, further comprising a communication unit.

6. A system comprising the device according to claim 5 and a device for determining a status of a plant or crop comprising a communication unit able to exchange data with the communication unit of the device.

7. The device according to claim 5, wherein the communication unit is a wireless communication unit.

8. The device according to claim 1, further comprising a locating unit.

9. The device according to claim 1, wherein the means for producing the solid particles from at least two solid, particulate compositions is configured to produce the solid particles using a process selected from a group consisting of fused deposition modelling, direct metal laser sintering, powder pressing, powder compaction and binder jetting.

10. A method for distributing solid, fertilizer particles to a field, comprising steps of:
   a) providing the device according to claim 1;
   b) providing the at least two solid, particulate compositions to the containers of the device;
   c) continuously producing the solid, fertilizer particles from the at least two solid, particulate compositions each having a different chemical composition with the means for producing the solid particles;
   d) continuously delivering the solid particles produced in step c) to the field with the means for delivering the solid particles to the field.

11. The method according to claim 10, wherein each solid, particulate composition of the at least two solid, particulate compositions comprises a nutrient not present in other of the solid, particulate compositions.

12. The method according to claim 10, wherein the solid, particulate compositions added to the containers each comprise an element selected from a group consisting of urea, ammonium nitrate, ammonium phosphate, potassium chloride and potassium sulphate.

13. The method according to claim 10, wherein the solid, particulate compositions have an average particle diameter ranging between 0.10 mm and 5.0 mm.

14. The method according to claim 10, wherein the step a) further includes providing a device for determining a status of a plant or crop comprising a communication unit able to exchange data with the communication unit of the device.

15. The method according to claim 14, wherein each of the communication units are wireless communication units.

* * * * *